(12) United States Patent
Schuster

(10) Patent No.: US 11,100,328 B1
(45) Date of Patent: Aug. 24, 2021

(54) SYSTEM TO DETERMINE PIPING CONFIGURATION UNDER SINK

(71) Applicant: Danco, Inc., Irving, TX (US)

(72) Inventor: Michael J. Schuster, Shorewood, IL (US)

(73) Assignee: Danco, Inc., Irving, TX (US)

( * ) Notice: Subject to any disclaimer, the term of this patent is extended or adjusted under 35 U.S.C. 154(b) by 15 days.

(21) Appl. No.: 16/788,373

(22) Filed: Feb. 12, 2020

(51) Int. Cl.
| | | |
|---|---|---|
| *G05B 19/4097* | (2006.01) | |
| *G06Q 10/06* | (2012.01) | |
| *G06Q 10/08* | (2012.01) | |
| *G06K 9/00* | (2006.01) | |
| *G06F 3/0482* | (2013.01) | |
| *G06T 7/70* | (2017.01) | |
| *G06K 9/62* | (2006.01) | |
| *G09B 19/00* | (2006.01) | |
| *G09B 5/02* | (2006.01) | |
| *G06N 20/00* | (2019.01) | |
| *E03C 1/122* | (2006.01) | |

(52) U.S. Cl.
CPC ....... *G06K 9/00671* (2013.01); *G06F 3/0482* (2013.01); *G06K 9/6256* (2013.01); *G06K 9/6267* (2013.01); *G06N 20/00* (2019.01); *G06T 7/70* (2017.01); *G09B 5/02* (2013.01); *G09B 19/003* (2013.01); *E03C 1/122* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 5,771,043 A | * | 6/1998 | Nigawara | G06T 19/20 345/419 |
| 6,647,305 B1 | * | 11/2003 | Bigelow | G06F 30/00 700/97 |
| 7,075,531 B1 | * | 7/2006 | Ando | G06T 13/80 345/420 |
| 8,230,362 B2 | * | 7/2012 | Couch | G01M 17/00 715/852 |
| 8,255,886 B2 | * | 8/2012 | Lachner | G06F 11/3664 717/136 |
| 8,296,732 B2 | * | 10/2012 | Fraley | G06F 9/44505 717/121 |
| 10,078,805 B2 | * | 9/2018 | Westlake | G06Q 10/06311 |
| 10,147,249 B1 | * | 12/2018 | Brady | G07C 9/00174 |
| 10,423,905 B2 | * | 9/2019 | Pettersson | G06Q 10/067 |
| 10,430,655 B2 | * | 10/2019 | Komatsu | G06T 19/006 |
| 10,757,382 B2 | * | 8/2020 | Okumura | G06F 3/0425 |

(Continued)

*Primary Examiner* — Jordany Nunez
(74) *Attorney, Agent, or Firm* — Thomas |Horstemeyer, LLP

(57) ABSTRACT

Disclosed are various embodiments for determining piping configurations in an under-sink or similar environment. A computing device, such as a mobile device or a server, may be directed to access a digital image, such as a photograph of an under-sink environment. An analysis of the under-sink environment may be performed to generate a plurality of suggested configurations of piping for placement in the under-sink environment using compliance criteria. A selection of one of the suggested configurations may be received and a parts list for the one of the suggested configurations may be generated. A series of instructions to complete an assembly of the one of the suggested configurations may be generated.

20 Claims, 9 Drawing Sheets

(56) References Cited

U.S. PATENT DOCUMENTS

| | | | |
|---|---|---|---|
| 10,802,784 B2 * | 10/2020 | Lee | G06F 1/1684 |
| 10,929,679 B1 * | 2/2021 | Keyvani | G06K 9/6256 |
| 2001/0030662 A1 * | 10/2001 | Ohkawa | G06F 3/0481 715/764 |
| 2003/0014212 A1 * | 1/2003 | Ralston | H04N 13/194 702/150 |
| 2003/0200123 A1 * | 10/2003 | Burge | G06Q 40/08 705/4 |
| 2004/0138775 A1 * | 7/2004 | Bigelow | G06F 30/00 700/182 |
| 2005/0172260 A1 * | 8/2005 | Eichstaedt | G06Q 10/063 717/104 |
| 2009/0017430 A1 * | 1/2009 | Muller-Daniels | G09B 23/30 434/262 |
| 2009/0024240 A1 * | 1/2009 | Clark | G06Q 10/06 700/111 |
| 2009/0119142 A1 * | 5/2009 | Yenni | H04L 67/12 705/7.15 |
| 2009/0193028 A1 * | 7/2009 | Kaplan | G06F 16/2477 |
| 2011/0176179 A1 * | 7/2011 | Judelson | G06T 19/00 358/448 |
| 2011/0179624 A1 * | 7/2011 | Sexton | G09B 19/04 29/428 |
| 2014/0192159 A1 * | 7/2014 | Chen | G06T 15/00 348/46 |
| 2014/0248950 A1 * | 9/2014 | Tosas Bautista | G06F 1/1694 463/31 |
| 2014/0268064 A1 * | 9/2014 | Kahle | H04N 9/3185 353/28 |
| 2015/0081367 A1 * | 3/2015 | Westlake | G06Q 10/06311 705/7.15 |
| 2015/0363076 A1 * | 12/2015 | Komatsu | G06F 3/04842 715/765 |
| 2016/0116903 A1 * | 4/2016 | Guerra Igarza | G05B 19/4097 700/97 |
| 2016/0224927 A1 * | 8/2016 | Pettersson | G06Q 50/08 |
| 2017/0083276 A1 * | 3/2017 | Lee | G06F 3/011 |
| 2017/0193461 A1 * | 7/2017 | Celinder | G06Q 10/20 |
| 2017/0205807 A1 * | 7/2017 | Grossman | G05B 19/4097 |
| 2018/0291799 A1 * | 10/2018 | Reed | F01P 11/04 |
| 2018/0336732 A1 * | 11/2018 | Schuster | G06Q 10/063118 |
| 2019/0180294 A1 * | 6/2019 | Mehta | G06Q 30/0201 |
| 2019/0238743 A1 * | 8/2019 | Kim | H04N 5/23203 |
| 2020/0042954 A1 * | 2/2020 | Parris | G06N 3/08 |
| 2021/0005103 A1 * | 1/2021 | Kocher | G09B 5/02 |
| 2021/0064648 A1 * | 3/2021 | Farri | G06F 16/44 |
| 2021/0097475 A1 * | 4/2021 | Ratcliff | G06Q 10/063114 |

* cited by examiner

SYSTEM TO DETERMINE PIPING CONFIGURATION UNDER SINK

BACKGROUND

Replacing or repairing piping, fittings, connections, and associated materials under sinks, basins, bathtubs, and other fixtures remains problematic. Piping configurations under sinks are not uniform due to varying building codes, different outlet locations, and subjective opinions of plumbers. Hardware stores often stock a multitude of different sizes, styles, shapes, and types of piping, such as polyvinyl chloride (PVC), ABS, copper, brass, as well as different types of fittings, connectors, etc. To replace or repair piping, a plumber, handyman, Do-It-Yourselfer's (DIY'ers), property owner, or other individual is usually tasked with performing a multitude of trial-and-error replacements, attempting to form a series of piping and fittings to get from one point to another. This often requires multiple runs to the hardware store, knowledge of building codes, and/or consultations with professional plumbers.

BRIEF SUMMARY OF THE INVENTION

Various embodiments for determining piping configurations in an under-sink and similar environment are disclosed. A computing device, such as a mobile device or a server, may be directed to access a digital image, such as a photograph of an under-sink environment, perform an analysis of the under-sink environment to generate a plurality of suggested configurations of piping for placement in the under-sink environment using compliance criteria, receive a selection of one of the suggested configurations, generate a parts list for the one of the suggested configurations as selected, generate a series of instructions to complete an assembly of the one of the suggested configurations as selected, and display the parts list and the series of instructions in a display device.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates to determining piping configurations for under-sink environments and similar plumbing-related environments. As noted above, replacing or repairing piping, fittings, connections, and associated materials under sinks, basins, bathtubs, and other fixtures remains problematic. Plumbing is a skillful trade and, as such, hiring plumbers and similar professionals is expensive and time intensive. Notably, piping configurations under sinks, tubs, or other fixtures that utilize plumbing are not uniform due to varying building codes, configurations and replacements that occur through the years, across different regions, different outlet locations, and subjective opinions of plumbers, contractors, or other professionals.

Moreover, hardware stores often stock a multitude of different sizes, styles, shapes, and types of piping, such as PVC, ABS, copper, and brass plumbing, as well as different types of fittings, connectors, etc. To replace or repair piping, a plumber, handyman, DIY'ers, property owner, or other individual is usually tasked with performing a multitude of trial-and-error replacements, attempting to form a series of piping and fittings to get from one point to another. This often requires multiple runs to the hardware store, knowledge of building codes, and consultations with professional plumbers.

Accordingly, various embodiments for determining piping configurations in an under-sink and similar environment are disclosed. A computing device, such as a mobile device or a server, may be directed to access a digital image, such as a photograph of an under-sink environment, to perform an analysis of the under-sink environment. From the analysis, the computing device may generate a plurality of suggested configurations of piping for placement in the under-sink environment using compliance criteria. Further, the computing device may receive a selection of one of the suggested configurations, generate a parts list for the one of the suggested configurations as selected, and generate a series of instructions to complete an assembly of the one of the suggested configurations as selected. Finally, the computing device may display the parts list and the series of instructions in a display device and perform other functions as will be described herein.

Figure 1:
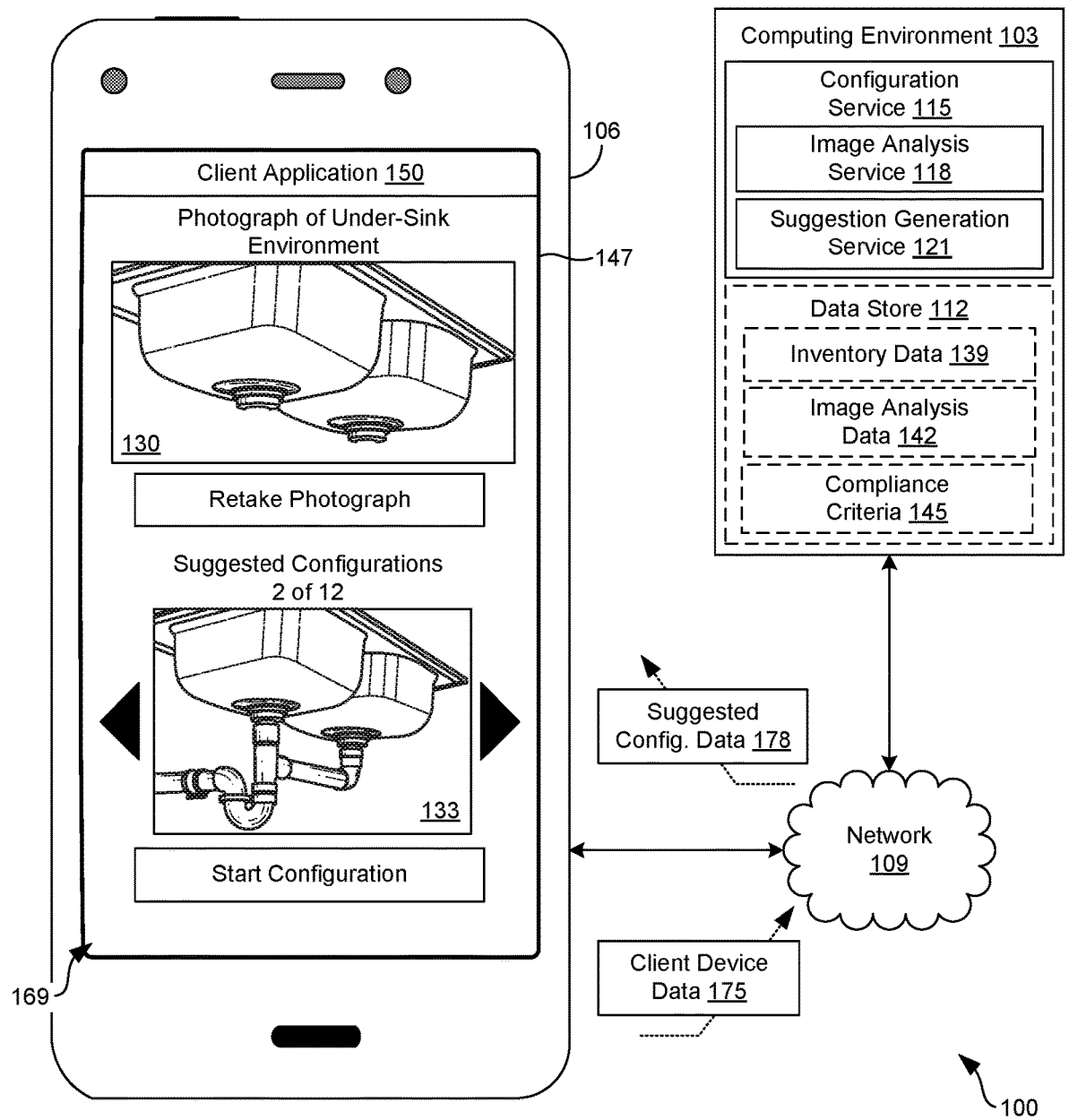
FIG. 1 is a drawing of a networked environment according to various embodiments of the present disclosure.

With reference to FIG. 1, shown is a networked environment 100 according to various embodiments. The networked environment 100 includes a computing environment 103, and a client device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include a configuration service 115. In some embodiments, the configuration service 115 may include an image analysis service 118, a suggestion generation service 121, as well as other services, applications, engines, modules, or other components not described herein.

In general, the configuration service 115 is executed to analyze one or more photographs or other digital representations of an under-sink environment, as well as data associated therewith, and suggest a configuration of piping to an operator of the client device 106. As such, the configuration service 115 may execute the image analysis service 118 to identify objects in a photograph or other digital representation of an under-sink environment 130. An "under-sink environment" may include an environment under, behind, or otherwise positioned relative to a sink or other liquid retaining basin, such as a bathtub, hot water heater, or other fixture. For instance, an under-sink environment can include a space underneath a kitchen or bathroom sink or a space behind a clothes washing machine or a dish washing machine, as may be appreciated. The image analysis service 118 may include those offered through Microsoft® Azure in some embodiments or other image analysis services.

In some embodiments, the image analysis service 118 may include an optical character recognition service (not shown) to extract words, characters, symbols, and other information from photographs, which may include model numbers, serial numbers, dimensions, or other information identifying objects or information associated therewith (e.g., sizes, material types, or other information of piping or components) in the under-sink environment.

The suggestion generation service 121 is executed to generate one or more suggested configurations 133 of piping that can be implemented in an under-sink environment. A suggested configuration 133 of piping may include a combination of pipes, couplers, connectors, fittings, adhesives, plumbing tape of varying sizes, makes, materials, and models, etc., that ultimately connects a first object to a second object. In some embodiments, the first object may include a sink whereas the second object may include an outlet pipe. In some embodiments, the first object may include a water link whereas the second object may include a faucet, and so forth.

The data stored in the data store 112 includes, for example, inventory data 139, image analysis data 142, compliance criteria 145, and potentially other data. The client device 106 is representative of a plurality of client devices that may be coupled to the network 109. The inventory data 139 may include data associated with physical plumbing components, such as different types, makes, models, sizes, dimensions, materials of pipes, connectors, fittings, plumbing tape, and other components known to be utilized in under-sink environments 130.

The image analysis data 142 may include data utilized by the configuration service 115 in pre-processing digital images, implementing machine learning or other object identification and classification, as well as similar data. For instance, in some embodiments, image analysis data 142 may include black-and-white (e.g., grayscale), orthomosaic, or other images processed from one or more digital images of an under-sink environment 130.

Compliance criteria 145 may include various requirements for piping configurations, such as federal, regional, or local building code requirements, manufacturer requirements for piping, couplers, adhesives, tape, or other components.

The client device 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smart glasses, or other devices with like capability. The client device 106 may include a display 147 (also referred to as a display device). The display 147 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, lens of smart glasses etc. The client device 106 may include a camera, such as a front-facing or rearward-facing camera, as may be appreciated, that is capable of capturing one or more photographs of an under-sink environment 130.

The client device 106 may be configured to execute various applications such as a client application 150 and/or other applications. The client application 150 may be executed in a client device 106, for example, to access network content served up by the computing environment 103 and/or other servers, thereby rendering a user interface 169 on the display 147. To this end, the client application 150 may comprise, for example, a browser, a dedicated application, etc., and the user interface 169 may comprise a network page, an application screen, etc. The client device 106 may be configured to execute applications beyond the client application 150 such as, for example, email applications, social networking applications, word processors, spreadsheets, and/or other applications.

Next, a general description of the operation of the various components of the networked environment 100 is provided. The client device 106 may be employed by an operator to capture one or more digital images. For instance, the client application 150 may prompt or otherwise aid an operator of the client device 106 to capture a photograph of the under-sink environment 130 using a camera of the client device 106 or other digital imaging device. As such, one or more of the digital images may include one or more photographs or video captured of an under-sink environment 130. The client application 150 may send the one or more digital images captured or provided by the operator from the client device 106 to the computing environment 130 as client device data 175.

Upon receipt of the one or more digital images or other client device data 175, the computing environment 103 may perform an analysis of the digital images of the under-sink environment 130. In various embodiments, the analysis is performed to generate a plurality of suggested configurations 133 of piping for placement in the under-sink environment 130 using compliance criteria 145, as will be described.

Initially, the image analysis service 118 may pre-process the one or more digital images to facilitate identification or classification of objects in the one or more digital images. As such, pre-processing may include altering colors of the one or more digital images, such as adjusting colors or converting the one or more digital images to grayscale images. In other examples, pre-processing may include generating an orthomosaic image comprising a plurality of digital images taken from alternative angles or positions, and so forth. In further examples, pre-processing may include generating a three-dimensional reconstruction formed using a plurality of digital images taken from alternative angles or positions.

Further, in some embodiments, the image analysis service 118 may apply an object detection and classification routine to the one or more digital images to identify a presence and a location of at least one component in the under-sink environment 130. For instance, the objects may include one or more of a sink (or other basin), pipes, drain pipes extending from a sink, a drain outlet, a water line, a water line valve, a garbage disposal, a garbage disposal inlet or outlet, a dishwasher line, and other objects generally known as residing in under-sink environments 130.

In some embodiments, the object detection and classification routine is a machine learning routine configured for object detection and classification, where the machine learning routine is trained using manually-verified object classification data. To this end, manually-verified object classification data can include objects manually verified as being accurate, such as one or more of a sink (or other basin), pipes, drain pipes extending from a sink, a drain outlet, a water line, a water line valve, a garbage disposal, a garbage disposal inlet or outlet, a dishwasher line, and so forth. In some embodiments, the machine learning routine is a deep learning routine, a convolutional neural network (CNN) routine, or other machine learning routine known to be applied for object identification and classification.

Ultimately, the image analysis service 118 may generate an array, data object, or other data comprising a list of identified objects in the under-sink environment 130, as well as their corresponding location in the under-sink environment 130. Further, in some embodiments, the list may include empty regions or, in other words, regions in which no objects were located. Using this list of the objects in the under-sink environment 130 (and the empty regions), the suggestion generation service 121 may determine a suggested configuration 133 of piping for the under-sink environment 130.

In some embodiments, the suggestion generation service 121 determines a first object that must be connected to a second object and utilizes compliance criteria 145 to generate a suggested configuration 133 of piping to connect the first object to the second object. For instance, an example of an under-sink environment 130 lacking any plumbing is shown in the top portion of the user interface 169 rendered on the display 147 of the client device 106.

From the under-sink environment 130 captured by the client device 106, the suggestion generating service 121 may identify a presence and location of two sinks, two sink drains, an outlet, and a large empty region below the two sinks. A suggested configuration 133 is shown in the user interface 169 below the under-sink environment 130. The suggested configuration 133 includes pipes, jamb nuts, a tailpiece, coupling nut, trap, as well as adhesive, tape, gaskets, and so forth required to form a proper seal of the components, which may be determined used compliance criteria 145. As such, the client device 106 may display a virtual representation of the suggested configuration 133 relative to the under-sink environment 130 prior to receipt of the confirmation of the suggested configuration 133.

In some embodiments, the image analysis service 118 may be unable to identify sizes of objects in the under-sink environment 130. For instance, if a machine learning routine cannot determine an identity, size, or location of an object in the under-sink environment 130 beyond a predefined degree of certainty, the computing environment 103 may direct the client application 150 to prompt an operator of the client device 106 to confirm an identity, size, or location of at least one component in the under-sink environment 130 prior to generating a suggested configuration 133.

In some embodiments, the configuration service 115 may first determine a number of sinks and/or bowls of a sink. For instance, the configuration service 115 may identify whether a sink is a single bowl sink, a double bowl sink, a triple bowl sink, etc., as well as a location of the bowls of the sink. Next, the configuration service 115 may determine whether a garbage disposal is present and, if present, a location of the garbage disposal. Thereafter, the configuration service 115 may then determine whether a dishwasher line is present and, if present, a location of the dishwasher line.

Then, the configuration service 115 may determine a drain and, if present, a location of a drain, such as left, center, right, etc. The configuration service 115 may identify a presence and a location of a drain outlet, where the position may be "high" or "low," or another position. After identifying objects, as well as locations and sizes thereof, the configuration service 115 may identify a shortest path from one component to another.

Further, in some embodiments, an object having a constant size between a wide range of under-sink environments 130 may be used to identify relative sizes of other components. For instance, 1.5 inch polyvinyl chloride tubing is commonly used in under-sink environments 130. As such, identifying a polyvinyl chloride tube having a 1.5 inch width, other sizes of relative components may be determined using known image processing techniques. It is understood that some routines may require utilization of multiple digital images captured from varying angles. After the foregoing is determined, a suggested configuration 133 may be determined.

In various embodiments, the suggestion generation service 121 may generate a plurality of suggested configurations 133, and send the suggested configurations 133 to the client device 106 for display, as suggested configuration data 178. For instance, the client application 150 can display the suggested configurations 133 and allow an operator of the client device 106 to select a desired one of the suggested configurations 133. As such, the client device 106 and/or the computing environment 103 can receive a selection of one of the suggested configurations 133 from the client application 150.

Next, the configuration service 115 may generate a parts list for the one of the suggested configurations 133 as selected in the client application 150. As may be appreciated, the parts list may include a list of the components used and shown in the suggested configuration 133 selected by the operator.

The configuration service 115 may then generate a series of instructions to complete an assembly of one of the suggested configurations as selected and may display the parts list and the series of instructions in the display 147 communicatively coupled to the client device 106. In further embodiments, the computing environment 103 and/or the client device 106 may verify a completion of individual ones of the tasks in the series of instructions, for instance, by manual verification of the operator, through further image analysis of sequences of the under-sink environment 130, etc.

Figure 2:
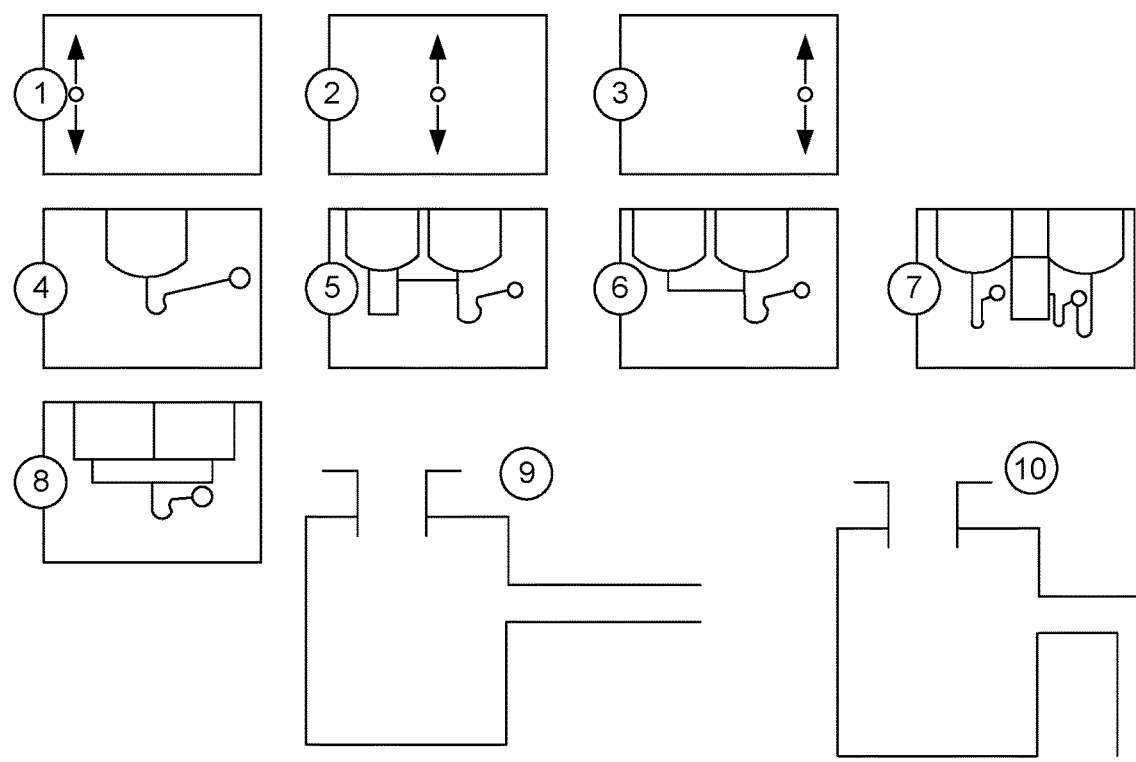
FIG. 2 is a pictorial diagram illustrating various under-sink environments according to various embodiments of the present disclosure.
Figure 6:
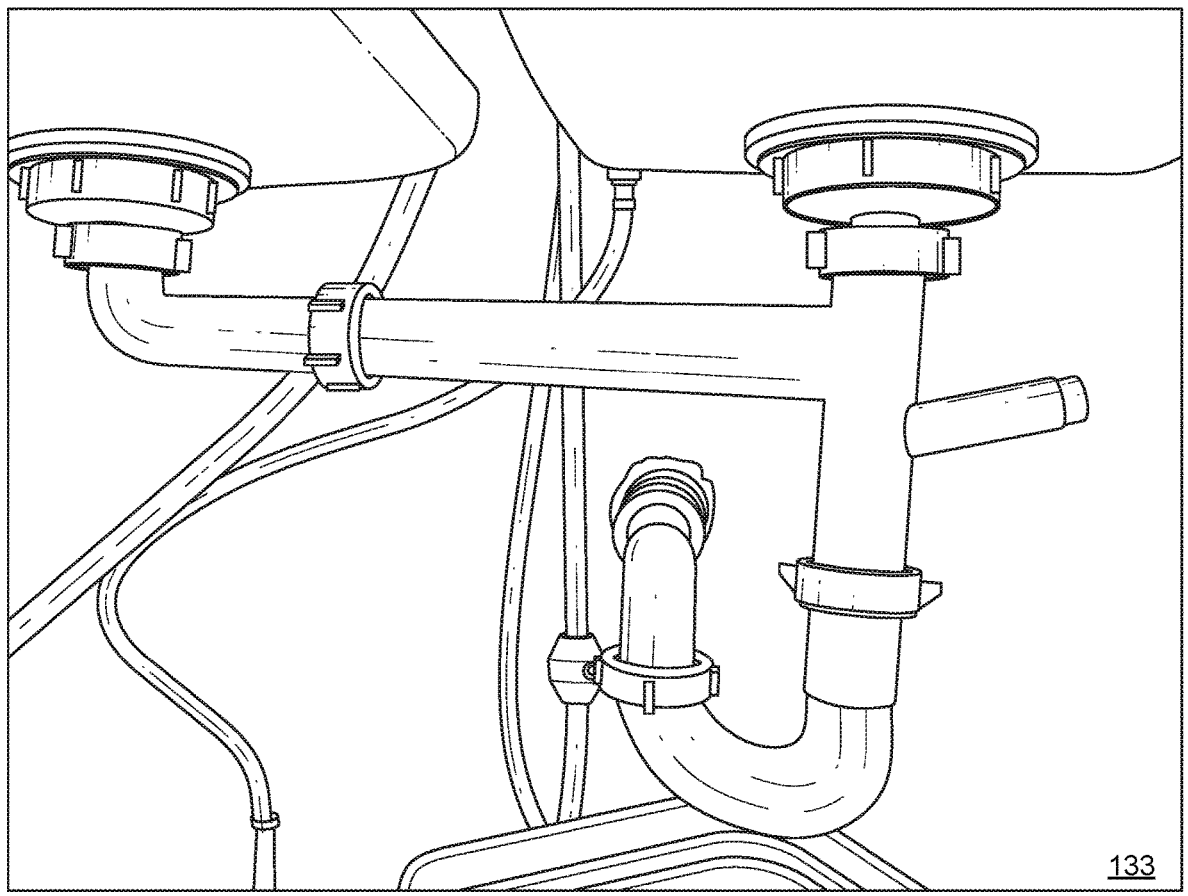

Turning now to FIG. 2, a pictorial diagram 200 is shown illustrating various under-sink environments 130 according to various embodiments of the present disclosure. Regions 1-3 of FIG. 2 show drain line locations. Specifically, in Region 1, a left drain line location is shown, in Region 2, a center drain line location is shown, and in Region 3, a right drain line location is shown. Regions 1-3 shows drain outlet being variable in height (high or low). Region 4 shows single sink bowl with a tail piece and a trap. Region 5 shows a double bowl sink with a disposal (shown on the left) continuous waste, tee, tail piece, trap and trap adapter etc. Region 6 shows a double bowl sink without a disposal. Region 7 of FIG. 2 shows a triple bowl sink with a disposal shown in the middle and two drain outlets. Region 8 of FIG. 2 shows a double bowl sink with a center tee, continuous waste, and drain located closer to the center of cabinet opening. Regions 9 and 10 show varying shapes of outlet pipes. Accordingly, the configuration service 115 may identify a presence and a location of a garbage disposal outlet(s) and/or other components located in an under-sink environment 103. A garbage disposal outlet may be positioned straight off a sink drain pipe, as shown in FIG. 4. Alternatively, it may include an elbow as shown in FIG. 6.

Figure 3A:
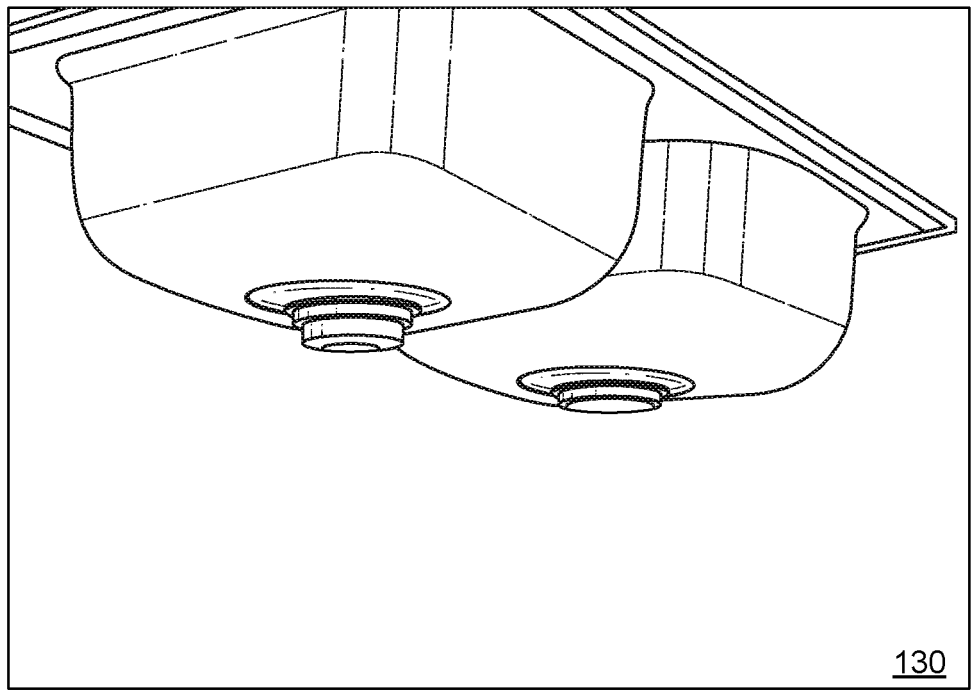
FIG. 3A is a drawing of an under-sink environment according to various embodiments of the present disclosure.
Figure 3B:
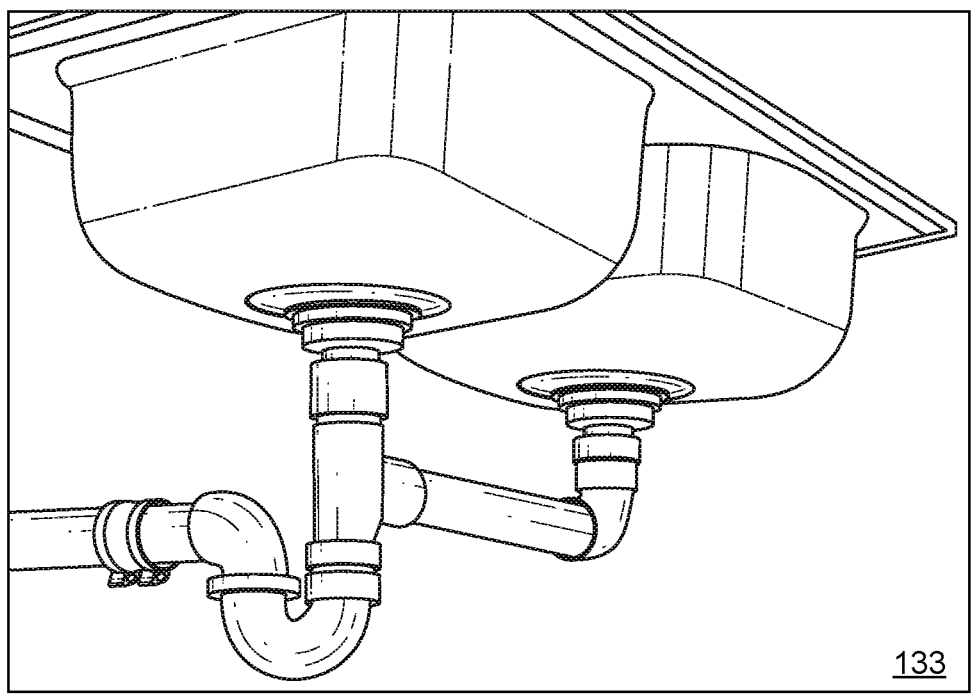
FIG. 3B is a drawing of a suggested configuration of the under-sink environment of FIG. 3A according to various embodiments of the present disclosure.

Referring next to FIGS. 3A and 3B, FIG. 3A is a drawing of an under-sink environment 130 and FIG. 3B is a drawing of a suggested configuration 133 of the under-sink environment 130 of FIG. 3A according to various embodiments of the present disclosure. With respect to the under-sink environment 130 of FIG. 3A, the image analysis service 118 may identify the presence of a two-basin sink lacking any drain piping or other objects in the under-sink environment 130. As shown, an outlet is not identifiable from the under-sink environment 130, the client application 150 may prompt the user to provide a location of the outlet or may identify the outlet from another digital image of the under-sink environment 130, for instance, from an alternative angle. The suggested configuration 133 may include a drain pipe extending from each of the basins, a trap pipe, and an outlet pipe, as well as associated fittings, couplers, and other components. The suggested configuration 133 may be generated such that it applies with building codes of a location of the client device 106 or best practices.

Figure 4A:
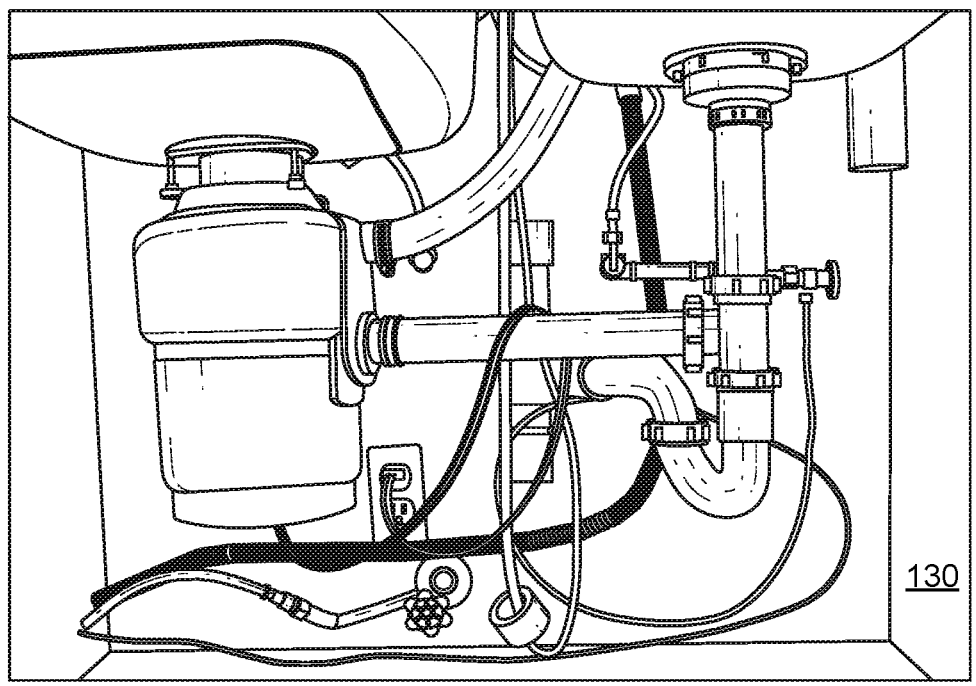
FIG. 4A is a drawing of an under-sink environment according to various embodiments of the present disclosure.
Figure 4B:
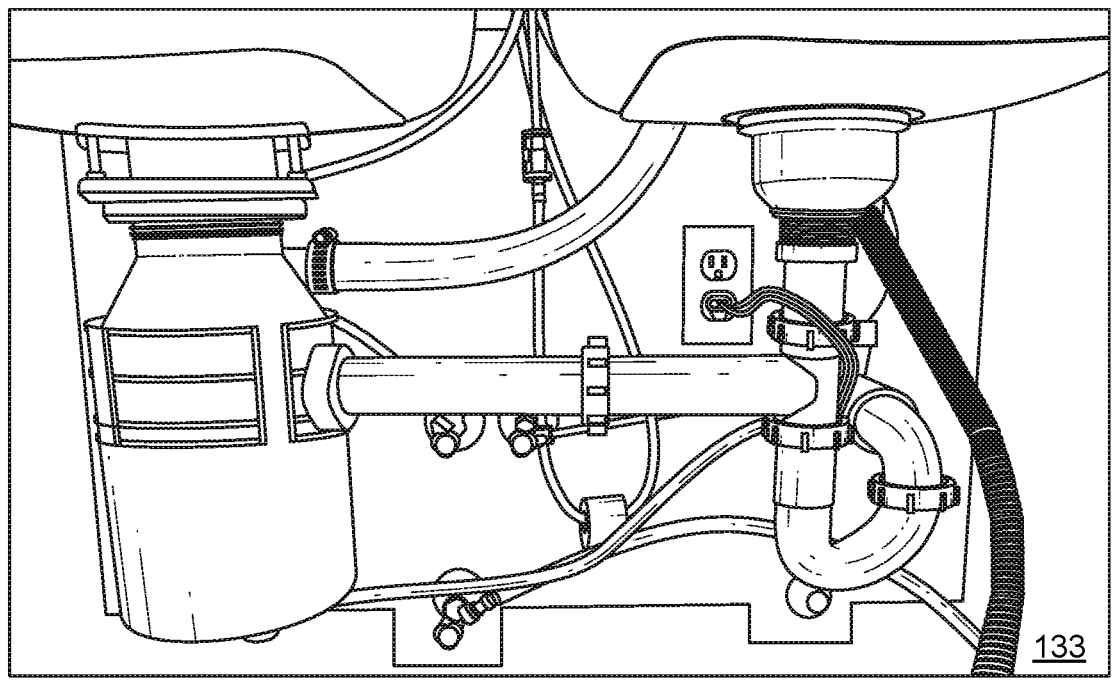
FIG. 4B is a drawing of a suggested configuration of the under-sink environment of FIG. 4A according to various embodiments of the present disclosure.
Figure 5:
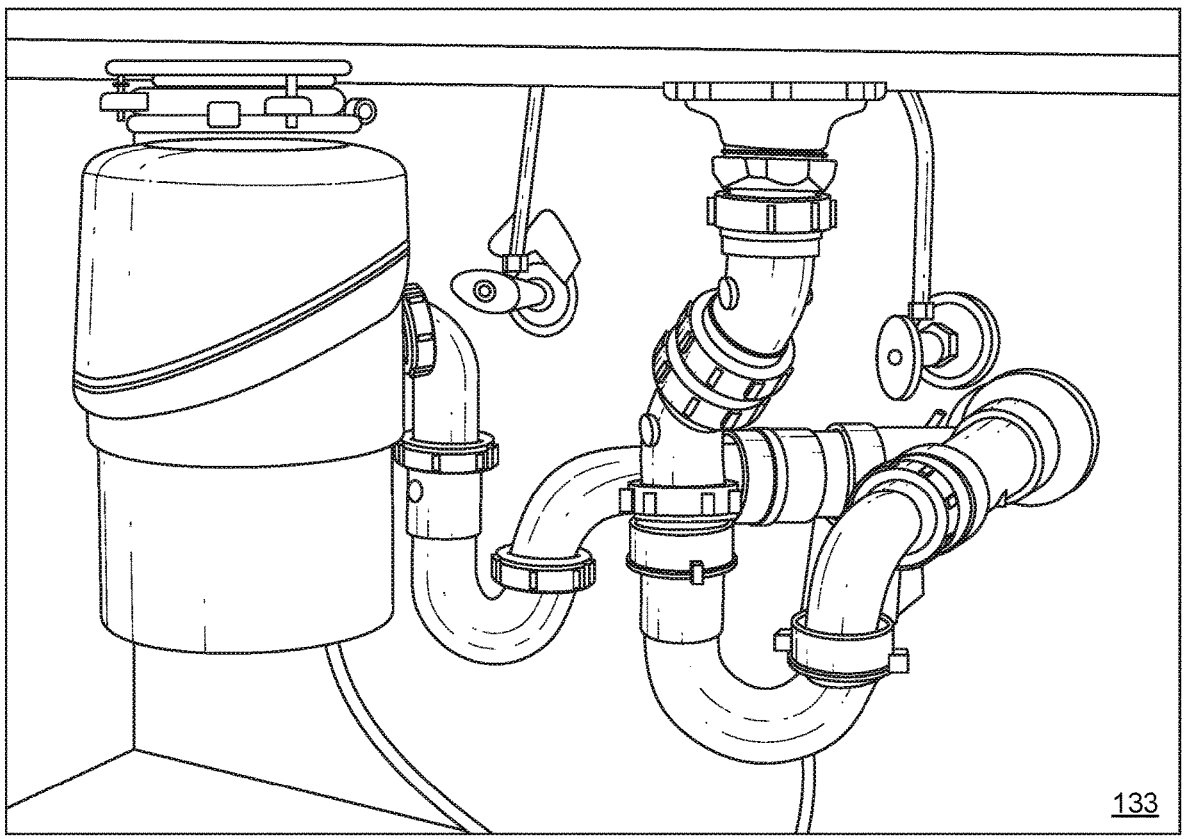
FIGS. 5-7 are various examples of under-sink environments according to various embodiments of the present disclosure.
Figure 7:
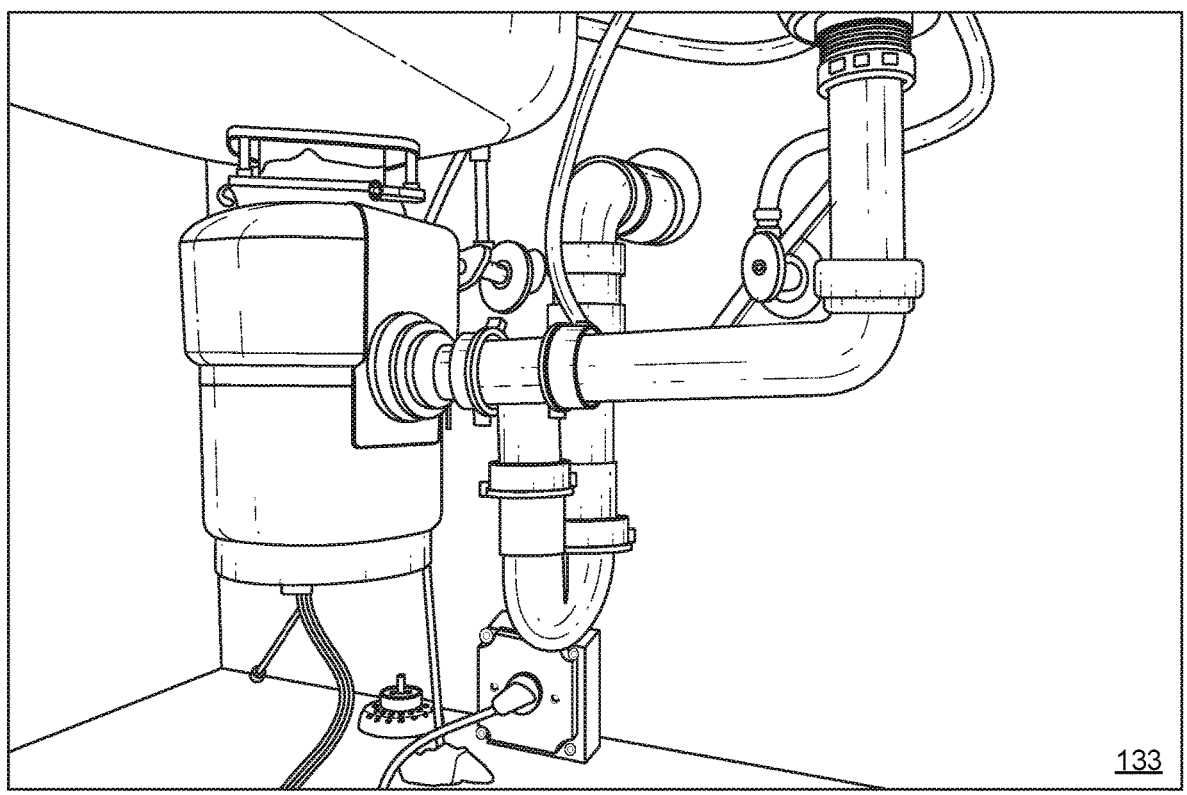

Moving along to FIGS. 4A and 4B, FIG. 4A is another drawing of an under-sink environment 130 and FIG. 4B is a drawing of a suggested configuration 133 of the under-sink environment 130 of FIG. 4A according to various embodiments of the present disclosure. With respect to the under-sink environment 130 of FIG. 4A, the image analysis service 118 may identify the presence of a two-basin sink having a garbage disposal, an electrical outlet, water valves, water lines, and a water outlet, etc. Here, the water outlet is identifiable in the under-sink environment 130. The suggested configuration 133 may include a reworking of the under-sink environment 130 to provide a cleaner configuration, such as a drain pipe extending from a first basin, a garbage disposal extending from a second basin, a trap pipe, and an outlet pipe, as well as associated fittings, couplers, and other components. Again, the suggested configuration 133 may be generated such that it applies with building codes of a location of the client device 106 or best practices. FIGS. 5-7 illustrate additional examples of suggested configurations 133 generated by the computing environment 103 according to various embodiments of the present disclosure.

Figure 8:
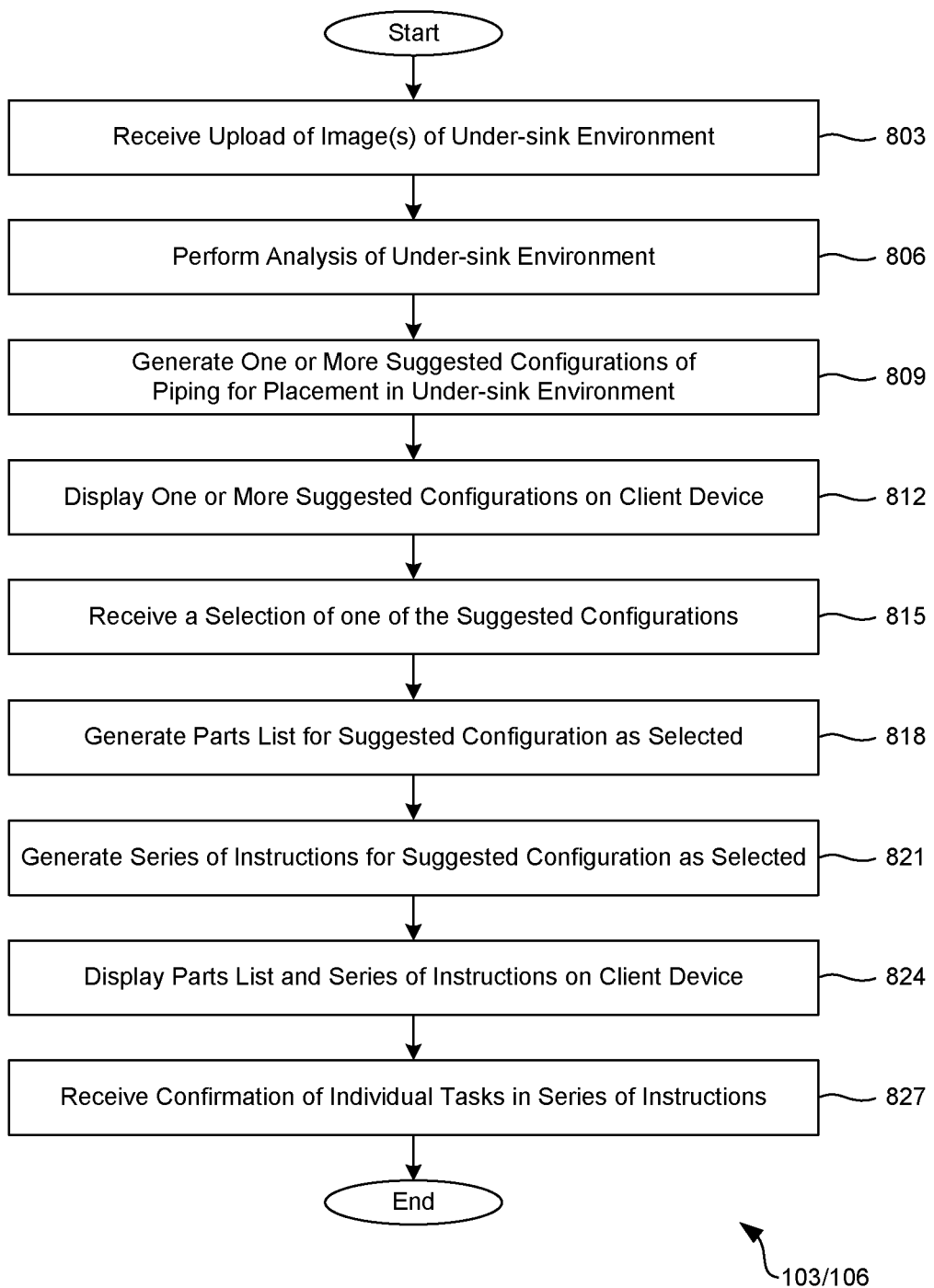
FIG. 8 is a flowchart illustrating one example of functionality implemented as portions of a client device or a computing environment in the networked environment of FIG. 1 according to various embodiments of the present disclosure.

Referring next to FIG. 8, a flowchart is shown illustrating one example of functionality implemented as portions of a computing environment 103 and/or a client device 106 in the networked environment 100 of FIG. 1 according to various embodiments of the present disclosure.

Initially, the client device 106 may be employed by an operator to capture one or more digital images of an under-sink environment 130. For instance, the client application 150 may prompt or otherwise aid an operator of the client device 106 to capture one or more photographs of the under-sink environment 130 using a camera of the client device 106 or other digital imaging device. The one or more digital images may include one or more photographs or video captured of an under-sink environment 130. As such, in step 803, the computing environment 103 may receive an upload of one or more digitals images captured or otherwise provided from the client device 106, for instance, as client device data 175.

In step 806, upon receipt of the one or more digital images or other client device data 175, the computing environment 103 may perform an analysis of the under-sink environment 130 embodied in the digital images received in step 803. In various embodiments, the analysis is performed to generate a plurality of suggested configurations 133 of piping for placement in the under-sink environment 130 using compliance criteria 145, as will be described.

Ultimately, the image analysis service 118 may generate an array, data object, or other data comprising a list of identified objects in the under-sink environment 130, as well as their corresponding location in the under-sink environment 130. Further, in some embodiments, the list may include empty regions or, in other words, regions in which no objects were located. It may also instruct user to remove items from inside sink (e.g. bottles or cans of cleaning products and other components) to help improve the search image.

In step 809, the computing environment 103 may generate one or more suggested configurations 133 of piping for placement in the under-sink environment 130. For instance, using a list of the objects in the under-sink environment 130 (and the empty regions), as well as a location of an outlet and a shortest distance between the outlet and an object to be connected to the outlet, the suggestion generation service 121 may determine one or more suggested configurations 133 of piping for the under-sink environment 130.

In some embodiments, the computing environment 103 may determine a first object that must be connected to a second object and utilizes compliance criteria 145 to generate a suggested configuration 133 of piping to connect the first object to the second object. For instance, an example of an under-sink environment 130 lacking any plumbing is shown in the top portion of the user interface 169 rendered on the display 147 of the client device 106.

In step 812, the computing environment 103 may direct the client device 106 to display the one or more suggested configurations 133 generated in step 809. Referring back to FIG. 1, a suggested configuration 133 is shown in the user interface 169 below the under-sink environment 130. The suggested configuration 133 includes pipes, jamb nuts, a tailpiece, a coupling nut, a trap, as well as adhesive tape, gaskets, and so forth required to form a proper seal of the components, which may be determined using compliance criteria 145. As such, the client device 106 may display a virtual representation of the suggested configuration 133 relative to the under-sink environment 130 prior to receipt of the confirmation of the suggested configuration 133.

In some embodiments, the image analysis service 118 may be unable to identify sizes of objects in the under-sink environment 130. For instance, if a machine learning routine cannot determine an identity, size, or location of an object in the under-sink environment 130 beyond a predefined degree of certainty, the computing environment 103 may direct the client application 150 to prompt an operator of the client device 106 to confirm an identity, size, or location of at least one component in the under-sink environment 130 prior to generating a suggested configuration 133.

In some embodiments, the computing environment 103 may first determine a number of sinks and/or bowls of a sink. For instance, the computing environment 103 may identify whether a sink is a single bowl sink, a double bowl sink, a triple bowl sink, etc., as well as a location of the bowls of the sink. The computing environment 103 may then determine whether a garbage disposal is present and, if present, a location of the garbage disposal. Thereafter, the configuration service 115 may then determine whether a dishwasher line is present and, if present, a location of the dishwasher line.

Then, the computing environment 103 may determine a drain and, if present, a location of a drain, such as left, center, right, etc. The configuration service 115 may identify a presence and a location of a drain outlet, where the position may be "high" or "low," or another position. After identifying objects, as well as locations and sizes thereof, the computing environment 103 may identify a shortest path from one component to another.

Further, in some embodiments, an object having a constant size between a wide range of under-sink environments 130 may be used to identify relative sizes of other components. For instance, 1.5 inch polyvinyl chloride tubing is commonly used in under-sink environments 130. As such, identifying a polyvinyl chloride tube having a 1.5 inch width, other sizes of relative components may be determined using known image processing techniques. It is understood that some routines may require utilization of multiple digital images captured from varying angles. After the foregoing is determined, a suggested configuration 133 may be determined and shown on the client device 106.

In step 815, the computing environment 103 may receive or otherwise identify a selection of a desired one of the suggested configurations 133.

Next, in step 818, the computing environment 103 may generate a parts list for one of the suggested configurations 133 as selected in the client application 150. As may be appreciated, the parts list may include a list of the components used and shown in the suggested configuration 133 selected by the operator.

In step 821, the computing environment 103 may then generate a series of instructions to complete an assembly of one of the suggested configurations 133 as selected and, in step 824, the client device 106 may display the parts list and the series of instructions in the display 147 communicatively coupled to the client device 106.

In step 827, the computing environment 103 may verify or confirm individual ones of the tasks in the series of instructions, for instance, by manual verification of the operator, through further image analysis of sequences of the under-sink environment 130, etc. Thereafter, the process may proceed to completion.

Figure 9:
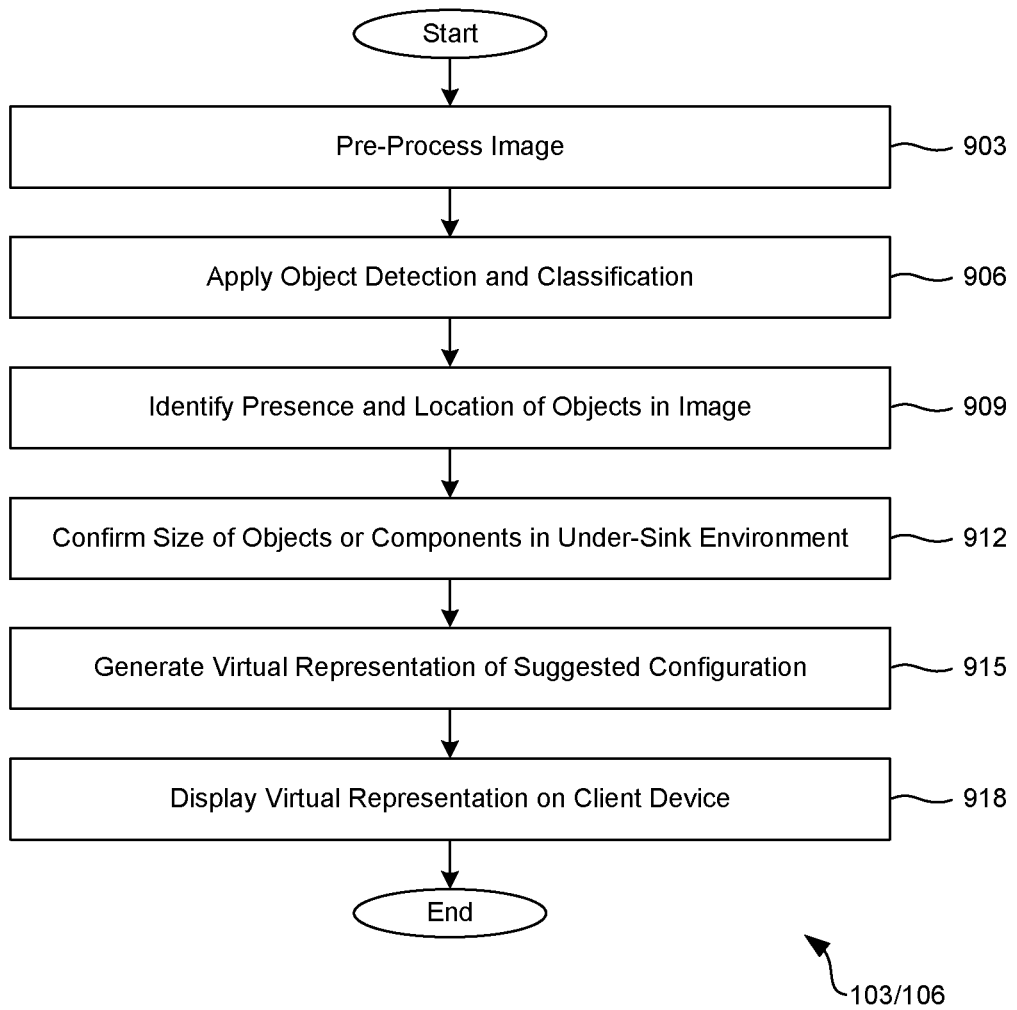
FIG. 9 is a flowchart illustrating one example of functionality implemented as portions of a client device or a computing environment in the networked environment of FIG. 1 according to various embodiments of the present disclosure.

Moving on FIG. 9, a flowchart is shown illustrating one example of functionality implemented as portions of a computing environment 103 and/or a client device 106 in the networked environment 100 of FIG. 1 according to various embodiments of the present disclosure.

Referring now to step 903, in some embodiments, the analysis may include pre-processing the one or more digital images to facilitate identification or classification of objects in the one or more digital images. For instance, pre-processing may include altering colors of the one or more digital images, adjusting colors or converting the one or more digital images to grayscale images, and so forth. In additional embodiments, pre-processing may include generating an orthomosaic image or a three-dimensional reconstruction of the under-sink environment 130 using a plurality of digital images taken from alternative angles or positions, and so forth.

Further, in steps 906 and 909, the computing environment 103 may apply an object detection and classification routine to the one or more digital images to identify a presence and a location of least one component in the under-sink environment 130. For instance, the objects may include one or more of a sink (or other basin), pipes, drain pipes extending from a sink, a drain outlet, a water line, a water line valve, a garbage disposal, a garbage disposal inlet or outlet, a dishwasher line, and other objects generally known as residing in the under-sink environments 130.

In some embodiments, the object detection and classification routine is a machine learning routine configured for object detection and classification, where the machine learning routine is trained using manually-verified object classification data. To this end, manually-verified object classification data can include objects manually verified as being accurate, such as one or more of a sink (or other basin), pipes, drain pipes extending from a sink, a drain outlet, a water line, a water line valve, a garbage disposal, a garbage disposal inlet or outlet, a dishwasher line, and so forth. In some embodiments, the machine learning routine is a deep learning routine, a CNN routine, or other machine learning routine known to be applied for object identification and classification.

In some embodiments, the computing environment 103 may be unable to identify sizes of objects in the under-sink environment 130. For instance, in step 912, if a machine learning routine cannot determine an identity, size, or location of an object in the under-sink environment 130 beyond a predefined degree of certainty, the computing environment 103 may direct the client application 150 to prompt an operator of the client device 106 to confirm an identity, size, or location of at least one component in the under-sink environment 130 prior to generating a suggested configuration 133.

Ultimately, the image analysis service 118 may generate an array, data object, or other data comprising a list of identified objects in the under-sink environment 130, as well as their corresponding location in the under-sink environment 130. Further, in some embodiments, the list may include empty regions or, in other words, regions in which no objects were located.

In steps 915 and 918, the computing environment 103 may generate a virtual representation of a suggested configuration 133, such as the one selected by the operator, and the client device 106 may display the virtual representation of the suggested configuration 133 on the client device 106. In some embodiments, the virtual representation of the suggested configuration 133 is shown relative to the undersink environment 130 prior to receipt of the confirmation of the suggested configuration 133.

The computing environment 103 may include one or more computing devices. Each computing device may include at least one processor circuit, for example, having a hardware processor and a memory, both of which are coupled to a local interface. To this end, each computing device may comprise, for example, at least one server computer or like device. The local interface may comprise, for example, a data bus with an accompanying address/control bus or other bus structure as can be appreciated.

Stored in the memory are both data and several components that are executable by the processor. In particular, stored in the memory and executable by the processor are the configuration service 115, the image analysis service 118, the suggestion generation service 121, machine learning routines or services, and potentially other applications. Also stored in the memory may be a data store 112 and other data. In addition, an operating system may be stored in the memory and executable by the processor.

It is understood that there may be other applications that are stored in the memory and are executable by the processor as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory and are executable by the processor. In this respect, the term "executable" means a program file that is in a form that can ultimately be run by the processor. Examples of executable programs may be, for example, a compiled program that can be translated into machine code in a format that can be loaded into a random access portion of the memory and run by the processor, source code that may be expressed in proper format such as object code that is capable of being loaded into a random access portion of the memory and executed by the processor, or source code that may be interpreted by another executable program to generate instructions in a random access portion of the memory to be executed by the processor, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor may represent multiple processors and/or multiple processor cores and the memory may represent multiple memories that operate in parallel processing circuits, respectively. In such a case, the local interface may be an appropriate network that facilitates communication between any two of the multiple processors, between any processor and any of the memories, or between any two of the memories, etc. The local interface may comprise additional systems designed to coordinate this communication, including, for example, performing load balancing. The processor may be of electrical or of some other available construction.

Although the applications, engines, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIGS. 8 and 9 show the functionality and operation of an implementation of portions of the computing environment 103 and/or the client device 106. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 8 and 9 show a specific order of execution, it is understood that the order of execution may differ from that which is depicted. For example, the order of execution of two or more blocks may be scrambled relative to the order shown. Also, two or more blocks shown in succession may be executed concurrently or with partial concurrence. Further, in some embodiments, one or more of the blocks shown in FIGS. 8 and 9 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device, or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a client device comprising at least one hardware processor; and
program instructions stored in memory and executable in the client device that, when executed, direct the client device to:
access at least one digital image, the at least one digital image comprising a photograph of an under-sink environment;
perform an analysis of the under-sink environment to generate a plurality of suggested configurations of piping for placement in the under-sink environment using compliance criteria;
receive a selection of one of the suggested configurations;
generate a parts list for the one of the suggested configurations as selected;
generate a series of instructions to complete an assembly of the one of the suggested configurations as selected; and
display the parts list and the series of instructions in a display communicatively coupled to the client device.

2. The system of claim 1, wherein the suggested configurations of the piping are generated by identifying, during the analysis, a presence and a location of:
at least one sink in the under-sink environment;
at least one drain pipe extending from the at least one sink in the under-sink environment;
a drain outlet in the under-sink environment; and
at least one of: a water line; a water line valve; a garbage disposal; a garbage disposal outlet; and a dishwasher line.

3. The system of claim 2, wherein the client device is further directed to:
display a virtual representation of the suggested configuration relative to the under-sink environment prior to receipt of a confirmation of the suggested configuration.

4. The system of claim 1, wherein the client device is further directed to:
prompt an operator of the client device to confirm a size of at least one component in the under-sink environment prior to generating the suggested configurations.

5. The system of claim 1, wherein the client device is further directed to verify a completion of at least one task in the series of instructions.

6. The system of claim 1, wherein the client device is further directed to pre-process the at least one digital image prior to the analysis of the under-sink environment.

7. The system of claim 1, wherein the client device is further directed to apply an object detection and classification routine to the at least one digital image to identify a presence and a location of at least one component in the under-sink environment.

8. The system of claim 7, wherein the object detection and classification routine is a machine learning routine configured for object detection and classification, the machine learning routine being trained using manually-verified object classification data.

9. A system, comprising:
at least one computing device comprising at least one hardware processor; and
program instructions stored in memory and executable in the at least one computing device that, when executed, direct the at least one computing device to:
access at least one digital image, the at least one digital image comprising a photograph of an under-sink environment received from a client device;
perform an analysis of the under-sink environment to generate a plurality of suggested configurations of piping for placement in the under-sink environment using compliance criteria;

receive a selection of one of the suggested configurations;

generate a parts list for the one of the suggested configurations as selected;

generate a series of instructions to complete an assembly of the one of the suggested configurations as selected; and send the parts list and the series of instructions to the client device for display in a display device communicatively coupled to the client device.

10. The system of claim 9, wherein the suggested configurations of the piping are generated by identifying, during the analysis, a presence and a location of:

at least one sink in the under-sink environment;

at least one drain pipe extending from the at least one sink in the under-sink environment;

a drain outlet in the under-sink environment; and at least one of: a water line; a water line valve; a garbage disposal; a garbage disposal outlet; and a dishwasher line.

11. The system of claim 10, wherein the at least one computing device is further directed to:

generate a virtual representation of the suggested configuration relative to the under-sink environment prior to receipt of a confirmation of the suggested configuration, the at least one computing device directing the client device to display the virtual representation of the suggested configuration.

12. The system of claim 9, wherein the at least one computing device is further directed to:

direct the client device to prompt an operator of the client device to confirm a size of at least one component in the under-sink environment prior to generating the suggested configuration.

13. The system of claim 9, wherein the at least one computing device is further directed to verify a completion of at least one task in the series of instructions.

14. The system of claim 9, wherein the at least one computing device is further directed to pre-process the at least one digital image prior to the analysis of the under-sink environment.

15. The system of claim 9, wherein the at least one computing device is further directed to apply an object detection and classification routine to the at least one digital image to identify a presence and a location of at least one component in the under-sink environment.

16. The system of claim 15, wherein the object detection and classification routine is a machine learning routine configured for object detection and classification, the machine learning routine being trained using manually-verified object classification data.

17. A computer-implemented method, comprising:

accessing, by at least one computing device comprising at least one hardware processor, at least one digital image, the at least one digital image comprising a photograph of an under-sink environment;

performing, by the at least one computing device, an analysis of the under-sink environment to generate a plurality of suggested configurations of piping for placement in the under-sink environment using compliance criteria;

receiving, by the at least one computing device, a selection of one of the suggested configurations;

generating, by the at least one computing device, a parts list for the one of the suggested configurations as selected;

generating, by the at least one computing device, a series of instructions to complete an assembly of the one of the suggested configurations as selected; and sending, by the at least one computing device, the parts list and the series of instructions to a client device for display in a display device communicatively coupled to the client device.

18. The computer-implemented method of claim 17, wherein the suggested configurations of the piping are generated by identifying, during the analysis, a presence and a location of:

at least one sink in the under-sink environment;

at least one drain pipe extending from the at least one sink in the under-sink environment;

a drain outlet in the under-sink environment; and at least one of: a water line; a water line valve; a garbage disposal; a garbage disposal outlet; and a dishwasher line.

19. The computer-implemented method of claim 17, further comprising:

generating, by the at least one computing device, a virtual representation of the suggested configurations relative to the under-sink environment prior to receipt of a confirmation of the suggested configuration, the at least one computing device directing the client device to display the virtual representation of the suggested configuration;

directing, by the at least one computing device, the client device to prompt an operator of the client device to confirm a size of at least one component in the under-sink environment prior to generating the suggested configuration;

verifying, by the at least one computing device, a completion of at least one task in the series of instructions; and pre-processing, by the at least one computing device, the at least one digital image prior to the analysis of the under-sink environment.

20. The computer-implemented method of claim 17, wherein:

the computer-implemented method further comprises applying an object detection and classification routine to the at least one digital image to identify a presence and a location of at least one component in the under-sink environment; and the object detection and classification routine is a machine learning routine configured for object detection and classification, the machine learning routine being trained using manually-verified object classification data.

* * * * *